(12) United States Patent
Hill

(10) Patent No.: US 8,303,005 B1
(45) Date of Patent: Nov. 6, 2012

(54) MOTOR VEHICLE DOOR PROTECTION ASSEMBLY

(76) Inventor: James O. Hill, Edgewater, FL (US)

( * ) Notice: Subject to any disclaimer, the term of this patent is extended or adjusted under 35 U.S.C. 154(b) by 0 days.

(21) Appl. No.: 13/241,685

(22) Filed: Sep. 23, 2011

(51) Int. Cl.
*B60R 19/42* (2006.01)

(52) U.S. Cl. ......................................... 293/126; 293/128

(58) Field of Classification Search ................ 293/109, 293/126, 128, 152, 1.07, 153; 49/502; 296/152, 296/1.07, 153
See application file for complete search history.

(56) References Cited

U.S. PATENT DOCUMENTS

| | | | | |
|---|---|---|---|---|
| 1,308,993 | A | * | 7/1919 | Ridington ..................... 296/153 |
| 2,226,615 | A | * | 12/1940 | Killen .............................. 49/462 |
| 3,494,075 | A | * | 2/1970 | Kunevicius ..................... 49/462 |
| 3,550,951 | A | * | 12/1970 | Cobbs ........................... 296/152 |
| D238,489 | S | | 1/1976 | Slingerland, Jr. |
| 4,573,288 | A | * | 3/1986 | Adell ............................... 49/462 |
| 5,188,407 | A | * | 2/1993 | Villaveces et al. ............. 293/128 |
| 6,971,693 | B1 | * | 12/2005 | Richardson .................... 293/128 |
| 7,007,988 | B1 | * | 3/2006 | Doyle ............................ 293/102 |
| 7,229,108 | B2 | | 6/2007 | Hochrein |
| 7,374,214 | B2 | | 5/2008 | Debs |
| 7,527,320 | B1 | * | 5/2009 | Nevell, Jr. ...................... 293/102 |
| 2002/0108314 | A1 | * | 8/2002 | Mantegazza .................... 49/462 |
| 2003/0062732 | A1 | | 4/2003 | Molina |
| 2008/0061568 | A1 | * | 3/2008 | Janus ............................. 293/126 |
| 2008/0258482 | A1 | | 10/2008 | Udolph |
| 2009/0026776 | A1 | | 1/2009 | Simmons |

* cited by examiner

*Primary Examiner* — Jason S Morrow

(57) ABSTRACT

A motor vehicle door protection assembly for protecting a motor vehicle door from fingerprints and impact damage includes a panel that has a front side, a back side, an upper edge, a lower edge, a first lateral edge and a second lateral edge. A securing flange is attached to the first lateral edge and is configured to engage an edge of a vehicle door. A mounting strip is attached to the panel. The mounting strip is comprised of a magnetic material.

6 Claims, 4 Drawing Sheets

MOTOR VEHICLE DOOR PROTECTION ASSEMBLY

BACKGROUND OF THE DISCLOSURE

Field of the Disclosure

The disclosure relates to motor vehicle door protection devices and more particularly pertains to a new motor vehicle door protection device for protecting a motor vehicle door from fingerprints and impact damage.

SUMMARY OF THE DISCLOSURE

An embodiment of the disclosure meets the needs presented above by generally comprising a panel that has a front side, a back side, an upper edge, a lower edge, a first lateral edge and a second lateral edge. A securing flange is attached to the first lateral edge and is configured to engage an edge of a vehicle door. A mounting strip is attached to the panel. The mounting strip is comprised of a magnetic material.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
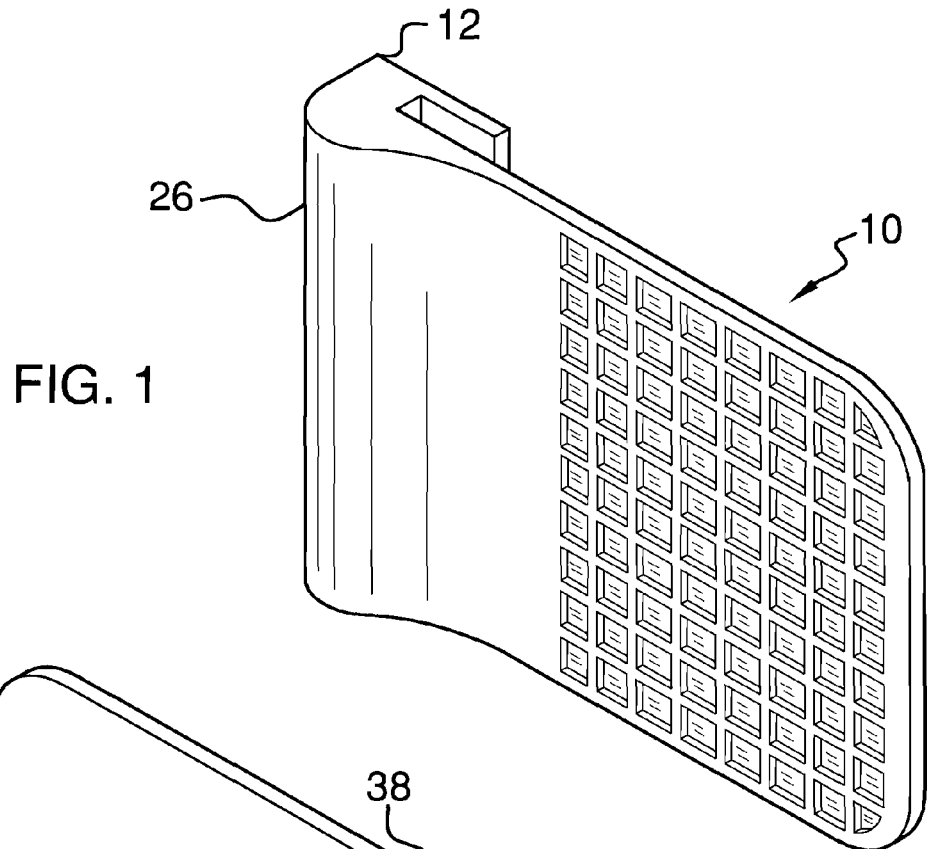
FIG. 1 is a front perspective view of a motor vehicle door protection assembly according to an embodiment of the disclosure.
Figure 2:
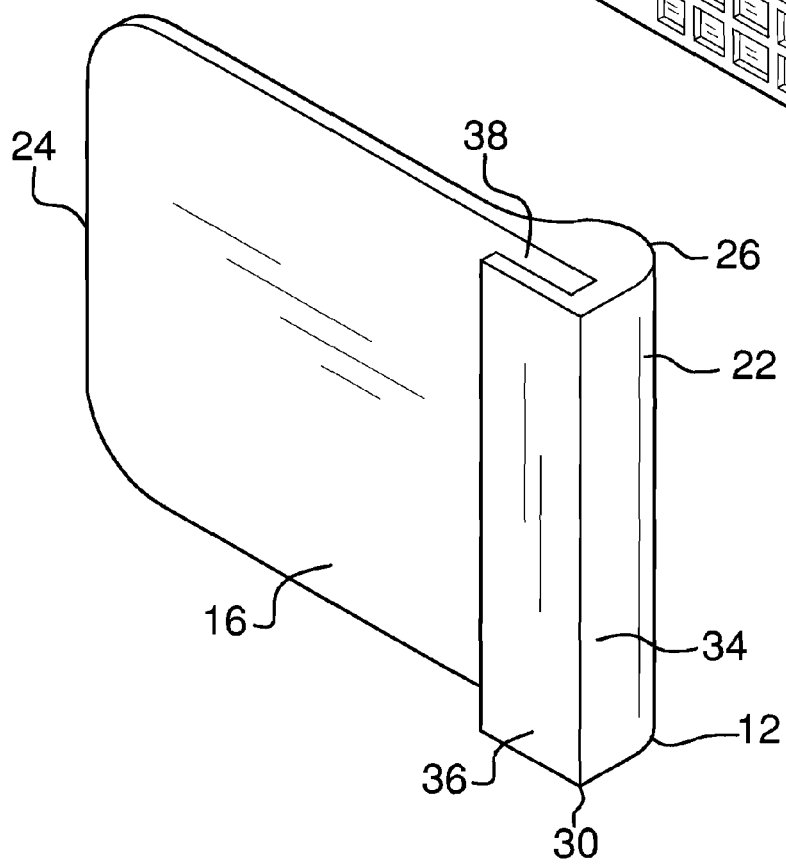
FIG. 2 is a back perspective view of an embodiment of the disclosure.
Figure 3:
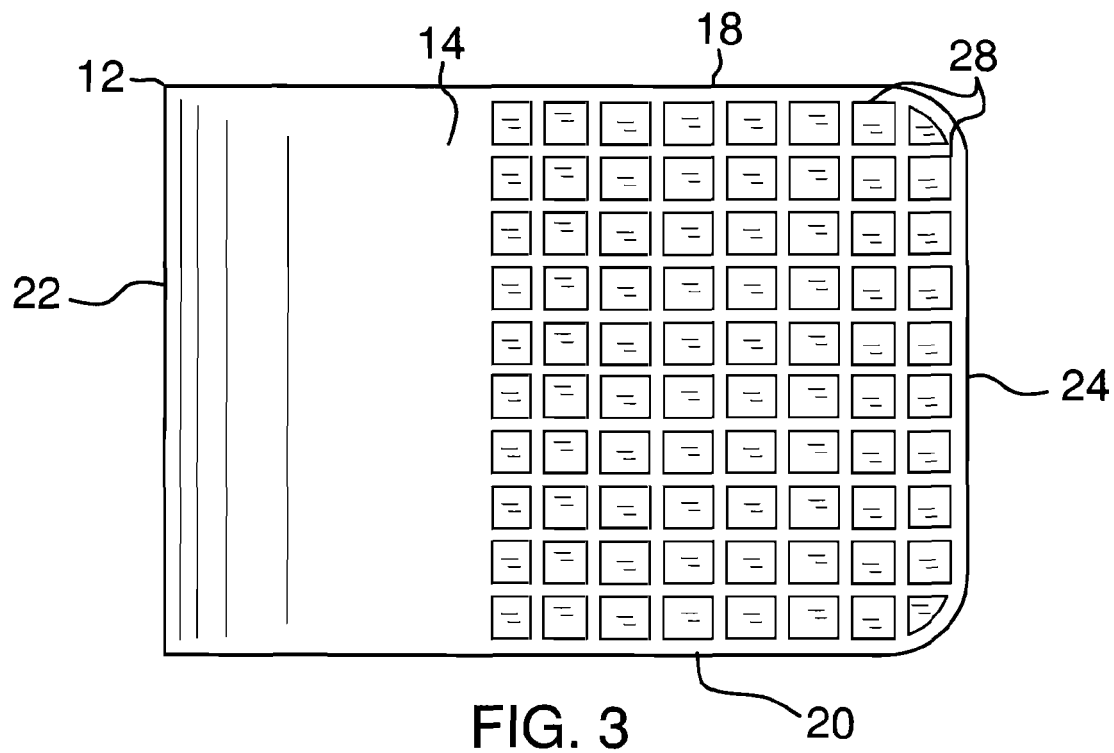
FIG. 3 is a front view of an embodiment of the disclosure.
Figure 4:
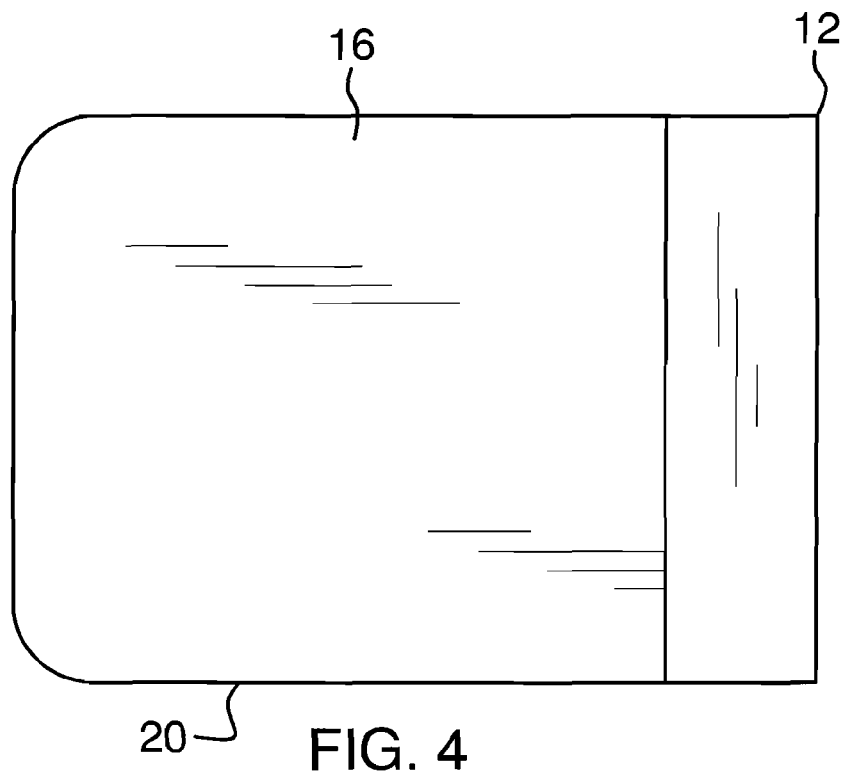
FIG. 4 is a back view of an embodiment of the disclosure.
Figure 5:
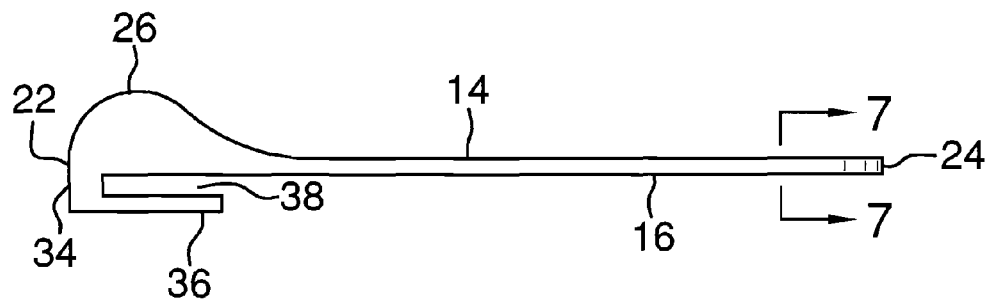
FIG. 5 is a top view of an embodiment of the disclosure.
Figure 6:
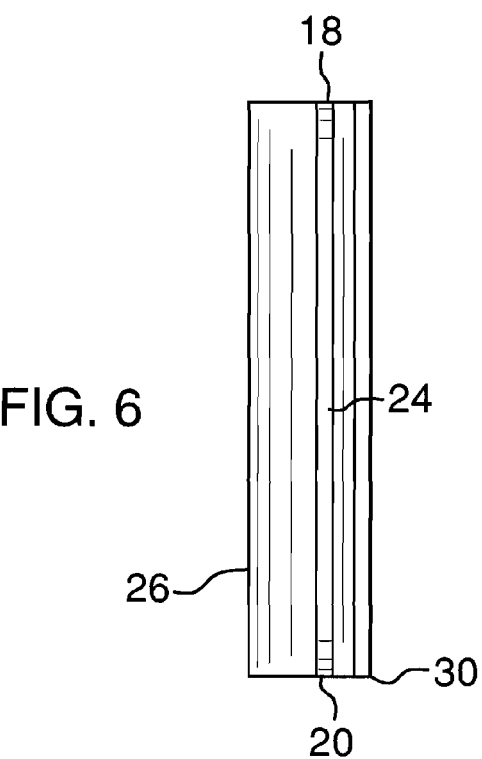
FIG. 6 is a lateral view of an embodiment of the disclosure.
Figure 7:
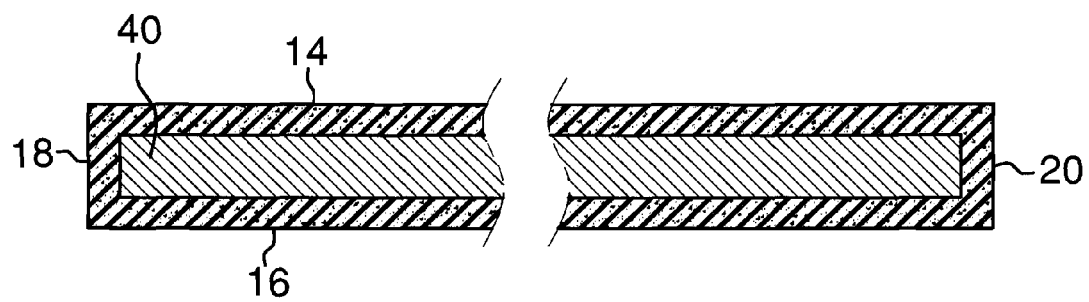
FIG. 7 is a cross sectional view of an embodiment of the disclosure.
Figure 8:
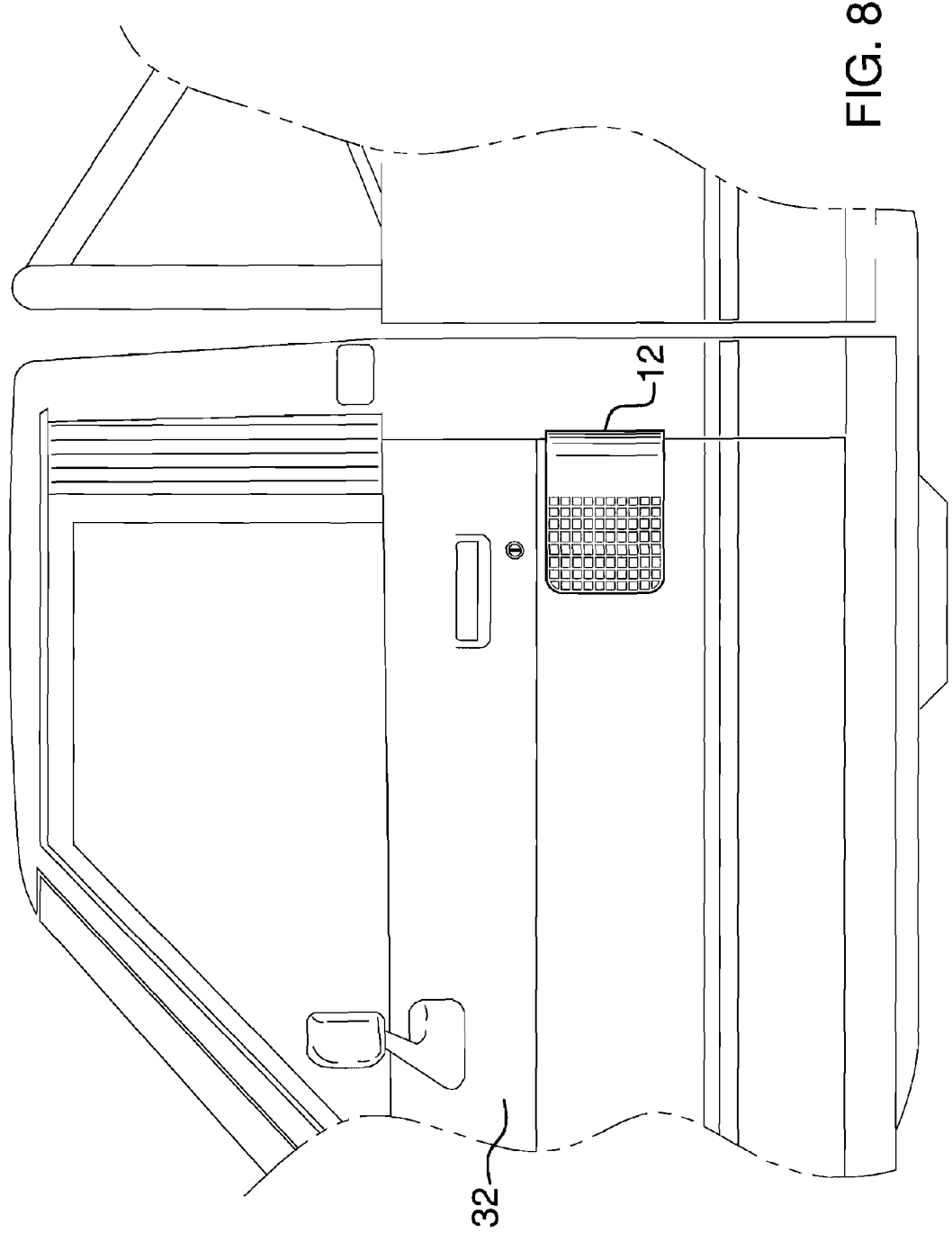
FIG. 8 is an in-use view of an embodiment of the disclosure.

With reference now to the drawings, and in particular to FIGS. 1 through 8 thereof, a new motor vehicle door protection device embodying the principles and concepts of an embodiment of the disclosure and generally designated by the reference numeral 10 will be described.

As best illustrated in FIGS. 1 through 8, the motor vehicle door protection assembly 10 generally comprises a panel 12 that has a front side 14, a back side 16, an upper edge 18, a lower edge 20, a first lateral edge 22 and a second lateral edge 24. The front side 14 has a convexly arcuate prominence 26 adjacent to and coextensive with the first lateral edge 22. The panel 12 is comprised of a resiliently compressible material. The front side 14 has indentations 28 therein to facilitate gripping of the panel 12.

A securing flange 30 is provided that is attached to the first lateral edge 22 and is configured to engage an edge of a vehicle door 32. The securing flange 30 has a first arm 34 and a second arm 36. The first arm 34 is attached to and extends rearward from the back side 16. The first arm 34 is coextensive with the first lateral edge 22. The second arm 36 forms a right angle with the first arm 34 and extends over the back side 16 to define a channel 38 configured to insertably receive an edge of the vehicle door 32.

A mounting strip 40 is provided that is attached to the panel 12. The mounting strip 40 is comprised of a magnetic material. The mounting strip 40 is configured to magnetically secure the bottom side 16 to the motor vehicle door 32 surface. The mounting strip 40 is positioned between the front 14 and back sides 16 and adjacent to the front edge 24.

In use, the securing flange 30 is attached to the edge of the motor vehicle door 32 by inserting the edge of the door 32 into the channel 38. The back side 16 of the panel 12 will lie flat against the surface of the door 32 and is secured to the door 32 by the magnetic mounting strip 40. The front side 14 is pushed against to close the open door 32. The panel 12 prevents marring of the door 32 from fingerprints and from impacts.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A motor vehicle door protection assembly configured for protecting a motor vehicle door from fingerprints and impact damage, said assembly comprising:
    a panel having a front side, a back side, an upper edge, a lower edge, a first lateral edge and a second lateral edges, said front side having indentations therein to facilitate gripping of said panel, said indentations being arranged into aligned rows and columns of said indentations forming a grid on said front side of said panel;
    a securing flange being attached to said first lateral edge and being configured to engage an edge of a vehicle door; and
    a mounting strip being attached to said panel, said mounting strip being comprised of a magnetic material.

2. The assembly according to claim 1, wherein said front side has a convexly arcuate prominence adjacent to and coextensive with said first lateral edge.

3. The assembly according to claim 1, wherein said protecting member is comprised of a resiliently compressible material.

4. The assembly according to claim 1, wherein said securing flange has a first arm and a second arm, said first arm being attached to and extending rearward from said back side, said first arm being coextensive with said back edge, said second arm forming a right angle with said first arm and extending over said back side to define a channel configure to insertably receive an edge of the vehicle door.

5. The assembly according to claim 1, wherein said mounting strip is positioned between said front and back sides and adjacent to said front edge.

6. A motor vehicle door protection assembly configured for protecting a motor vehicle door from fingerprints and impact damage, said assembly comprising:

a panel having a front side, a back side, an upper edge, a lower edge, a first lateral edge and a second lateral edges, said front side having a convexly arcuate prominence adjacent to and coextensive with said first lateral edge, said panel being comprised of a resiliently compressible material, said front side having indentations therein to facilitate gripping of said panel, said indentations including a pair of outer corner indentations, said outer corner indentations each having a pair of straight sides and a curvilinear side, said indentations including a plurality of rectangular indentations, said outer corner indentations and said rectangular indentations further being arranged into aligned rows and columns forming a grid on said front side of said panel;

a securing flange being attached to said first lateral edge and being configured to engage an edge of a vehicle door, said securing flange having a first arm and a second arm, said first arm being attached to and extending rearward from said back side, said first arm being coextensive with said back edge, said second arm forming a right angle with said first arm and extending over said back side to define a channel configure to insertably receive an edge of the vehicle door; and a mounting strip being attached to said panel, said mounting strip being comprised of a magnetic material, said mounting strip being configured to magnetically secure said bottom side to said motor vehicle door surface, said mounting strip being positioned between said front and back sides and adjacent to said front edge.

\* \* \* \* \*